(12) United States Patent
Sauterleute et al.

(10) Patent No.: US 6,505,474 B2
(45) Date of Patent: Jan. 14, 2003

(54) AIR CONDITIONING SYSTEM FOR AIRPLANES

(75) Inventors: Alfred Sauterleute, Heimenkirch (DE); Engelbert Schlagenhaft, Lindenberg (DE)

(73) Assignee: Liebherr-Aerospace, Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 09/962,610

(22) Filed: Sep. 26, 2001

(65) Prior Publication Data

US 2002/0035838 A1 Mar. 28, 2002

(30) Foreign Application Priority Data

Sep. 26, 2000 (DE) .......................... 100 47 623

(51) Int. Cl.[7] .............. F25B 9/00; F25D 9/00
(52) U.S. Cl. ............................... 62/172; 62/87
(58) Field of Search ................. 62/172, 87, 150, 62/402, 86, 88, DIG. 5; 454/71, 74, 75

(56) References Cited

U.S. PATENT DOCUMENTS

| | | | | |
|---|---|---|---|---|
| 4,283,924 A | * | 8/1981 | Schutze | 62/402 |
| 5,014,518 A | * | 5/1991 | Thomson et al. | 62/88 |
| 5,086,622 A | * | 2/1992 | Warner | 62/88 |
| 5,121,610 A | * | 6/1992 | Atkinson et al. | 62/151 |
| 5,461,882 A | * | 10/1995 | Zywiak | 62/401 |
| 5,704,218 A | * | 1/1998 | Christians et al. | 62/172 |
| 5,887,445 A | * | 3/1999 | Murry et al. | 62/402 |
| 6,070,418 A | * | 6/2000 | Crabtree et al. | 62/86 |
| 6,128,909 A | * | 10/2000 | Jonqueres | 62/87 |
| 6,189,324 B1 | * | 2/2001 | Williams et al. | 62/172 |
| 6,199,387 B1 | * | 3/2001 | Ssuterleute | 62/87 |
| 6,295,822 B1 | * | 10/2001 | Mueller | 62/172 |

FOREIGN PATENT DOCUMENTS

WO 99/51492 10/1999

* cited by examiner

Primary Examiner—Denise L. Esquivel
Assistant Examiner—Marc Norman
(74) Attorney, Agent, or Firm—Jacobson Holman PLLC (57) ABSTRACT

An air conditioning system for airplanes for conditioning moisture containing air, which is under excess pressure, for air conditioning an airplane cabin. The air conditioning system has at least one compressor, a first and a second air expansion turbine, and a water separator, which is disposed between the first and second air expansion turbine. To control the degree of moisture, the system adjusts selectively the degree of air expansion in the first air expansion turbine.

20 Claims, 8 Drawing Sheets

AIR CONDITIONING SYSTEM FOR AIRPLANES

BACKGROUND OF THE INVENTION

1. Field of The Invention

The invention relates to an air conditioning system for airplanes for conditioning the moisture containing air, which is under excess pressure, for air conditioning an airplane cabin.

2. Prior Art

The fresh air for air conditioning airplane cabins is conditioned from the air, the socalled bleed air, which is bled from the power plant at high pressure and high temperature. The air conditioning systems use the pressure and temperature potential of the power plant air to generate the requisite cooling capacity. The bleed air is cooled in the course of the fresh air conditioning process, dehumidified and expanded to the cabin pressure of approximately 1 bar during ground operations or approximately 0.8 bar during flight operations. Air dehumidification is especially relevant during the fresh air conditioning process in order to prevent the individual components of the air conditioning system from icing up and in particular to prevent the formation of ice crystals and mist in the fresh air to be conditioned. Of course, it is necessary to dehumidify predominantly in the ground area, because during flight operation, that is at high altitudes, the ambient air and thus the bled power plant air is extremely dry in any event.

The German patent application DE 100 36 443.8, which has not been previously published, proposed an air conditioning system for airplanes for conditioning the moisture containing air, which is under excess pressure, for air conditioning an airplane cabin. The system comprises at least one compressor for compressing the air, fed under excess pressure, to an even higher pressure; a first air expansion turbine for expanding the air to a lower pressure; a second air expansion turbine, which is downstream of the first one, to further expand the air; and a water separator, which is disposed between the first air expansion turbine and the second air expansion turbine. With this air conditioning system, the air can be largely dehumidified. Of course, this air conditioning system, like other prior art air conditioning systems, does not provide a control mechanism for the moisture content of the air that is available for air conditioning the airplane cabin.

SUMMARY OF THE INVENTION

Therefore, the object of the present invention is to improve this class of air conditioning system in such a manner that it is possible to control at the same time the moisture of the air that is available for air conditioning the airplane cabin without suffering any losses in the cooling capacity.

The invention solves this problem through a combination of features by providing an air conditioning system for airplanes that removes moisture contained in the air, under excess pressure. The air conditioning system comprises at least one compressor for compressing the air, which is already fed under excess pressure, to an even higher pressure. There is also a first air expansion turbine for expanding the air to a lower pressure, and a second air expansion turbine, which is downstream of the first air expansion turbine, to further expand the air. Another feature is a water separator which is positioned between the first air expansion turbine and the second air expansion turbine. The water separator selectively adjusts the air expansion in the first air expansion turbine.

In the inventive air conditioning system the component that serves the purpose of dehumidification is installed after the first air expansion turbine. Thus, the highly compressed, but still moist air, coming out of the main heat exchanger, is passed to the first air expansion turbine at approximately 45 degrees C.

From the air expansion turbine, the air that is expanded in a first step, but is still moist and in which the moisture condenses in very fine droplets due to the temperature drop, is passed into the water separator, which can comprise, for example, a drop coalescing unit and a water separator, which follows the drop coalescing unit.

The present invention benefits from the fact that the degree of condensed droplets depends on the temperature level, to which the highly compressed, but still moist air, which is passed into the turbine, is decreased. The higher the degree of air expansion is, the lower the temperature level of the air. As the temperature level decreases, the percentage of free water that condenses increases.

By adjusting selectively the degree of air expansion, the residual moisture in the air can be adjusted. Hence, the combination of the features of the air conditioning system which comprises at least one compressor for compressing the air to an even higher pressure, the first air expansion turbine that expands the air to a lower pressure, and the second air expansion turbine, positioned downstream from the first air expansion turbine, further expands the air.

Also, the water separator positioned between the first and second air expansion turbine removes water from the air which makes it possible to control the moisture of the air provided to air condition the airplane cabin.

Especially advantageous embodiments of the invention include the first air expansion turbine exhibiting variable nozzle cross sections, with the nozzle cross sections preferably changed by a gate valve.

In another embodiment, the first air expansion turbine of the air conditioning system exhibits a twin nozzle, which is connected to separate air feeds, so that one of the feeds can be blocked to selectively choose a desired nozzle.

A further embodiment includes a bypass for the first air expansion turbine. The bypass permits at least one substream of the air to be directed past the first air expansion turbine. Also, the bypass can be activated to open or close a gate valve.

In another embodiment of the air conditioning system, a fraction of the air stream can be controllably and directly fed by a control valve from the inlet or outlet of the second compressor behind the first air expansion turbine.

A still further embodiment provides for a humidifier for the air, bled from a power plant, disposed upstream of the primary heat exchanger.

In a still further embodiment, in addition to the degree of air expansion in the first air expansion turbine and the degree of air expansion in the second air expansion turbine, the air conditioning system can be selectively adjusted in several ways. Additionally, the second air expansion turbine can have variable nozzle cross sections. The nozzle cross sections of the secondary expansion turbine can be changed by a gate valve. Alternatively, the second air expansion turbine can have twin nozzles which are connected to separate air feeds, and one of the feeds can be blocked in the second air expansion turbine. A bypass is provided that can direct a substream of the air past the air expansion turbine, and a gate valve is provided to open and close the bypass.

The air conditioning system, can also have a fraction of the air controllably fed by a control valve at the inlet or outlet of the compressor behind the first air expansion turbine.

In another embodiment, the first and second air expansion turbines are on a common shaft and the nozzle cross sections are coupled for adjustments. Alternatively, the first and second air expansion turbines are on separate shafts, and the nozzle cross sections of the first and second air expansion turbines are separately adjustable as a function of each other.

Preferably, the first air expansion turbine exhibits variable nozzle cross sections. By adjusting the nozzle cross sections, the degree of expansion that can be achieved in the air expansion turbine can be adjusted in a simple manner. The smaller the nozzle cross section is set, the higher the degree of expansion can be achieved with the air expansion turbine. The nozzle cross section can be varied by means of suitably actuated gate valves.

According to another, but more complicated alternative, the degree of expansion can also be changed by adjusting the guide vanes in the air expansion turbine.

According to a simple embodiment, the first air expansion turbine exhibits a twin nozzle, where each part of the twin nozzle exhibits a separate feed and where one of these feeds can be blocked.

According to another alternative embodiment, the first air expansion turbine is provided with a bypass which may be controlled so as to open or close by means of a gate valve. With the bypass, a part of the highly compressed air can be delivered directly into the water separator by bypassing the turbine. In the water separator, only a very small fraction of the free water can be extracted.

According to another improved embodiment, the second air expansion turbine can also exhibit variable nozzle cross sections. To the extent the air expansion turbines are disposed on different shafts, the nozzle cross sections are adjusted by choice independently of each other. However, in the case that the two turbines are disposed side by side on a shaft, a combined adjustment of the nozzle cross sections can be especially advantageous.

Another embodiment of the invention provides a connecting line between the outlet or inlet of the second compressor and the outlet of the first air expansion turbine. This connecting line exhibits a control valve, by means of which, depending on the need, at least one part of the air stream from the compressor can be delivered again directly behind the air expansion turbine. Thus, comparatively moist air can be generated by bypassing the first air expansion turbine; and optionally the turbine can be protected from icing up.

For targeted active humidification of the air provided for air conditioning the airplane cabin, a humidifier can be provided that immediately raises the bleed air to a desired moisture level before entry into the primary heat exchanger.

Thus, the moisture content in the air, provided for air conditioning the airplane cabin, can be adjusted over a wide range with the air conditioning system, according to the present invention.

These together with other objects and advantages which will become subsequently apparent reside in the details of construction and operation as more fully hereinafter described and claimed, reference being had to the accompanying drawings forming a part hereof, wherein like numerals refer to like parts throughout.

Other details and advantages of the invention are explained in detail with reference to the embodiments depicted in the drawings.

DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
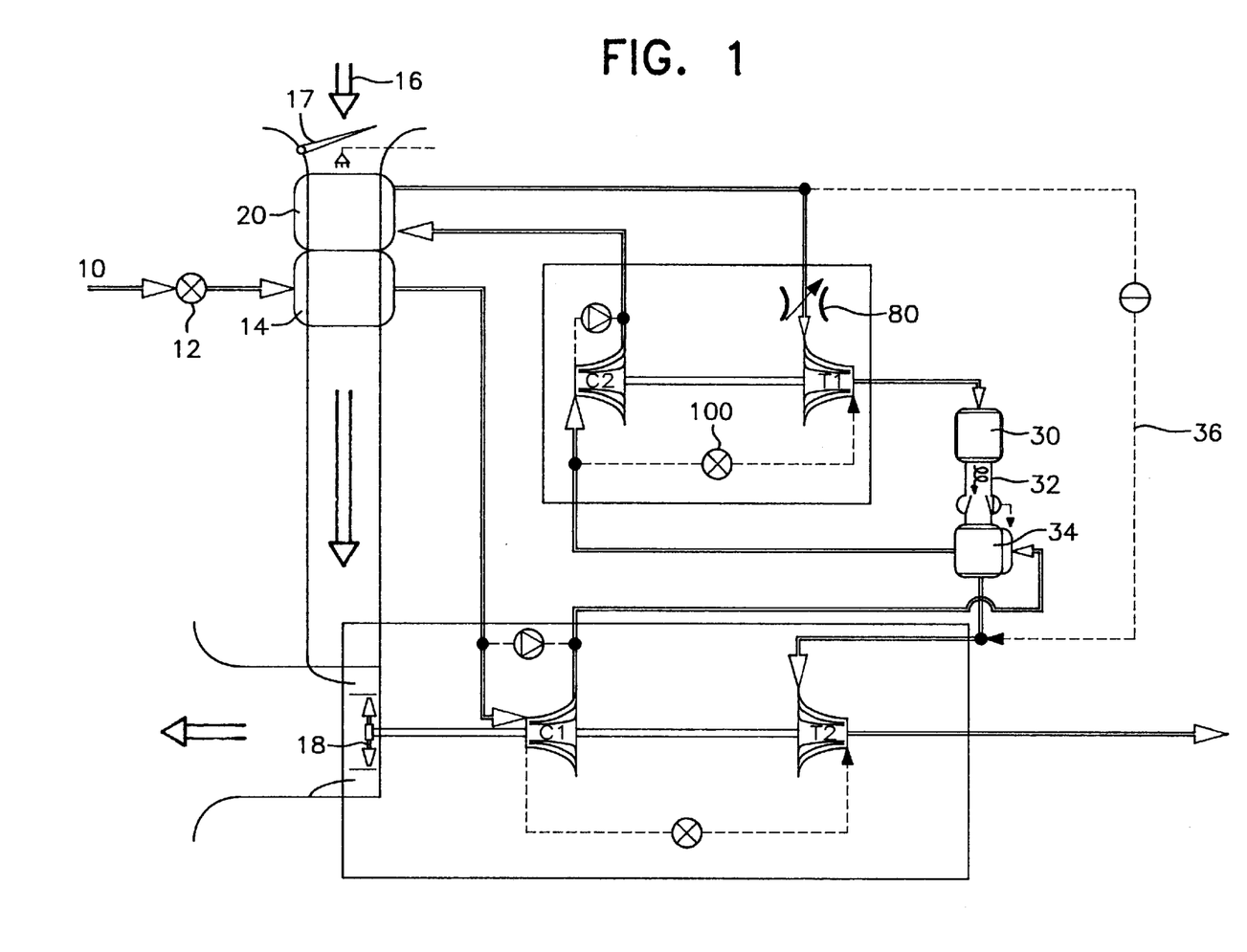
FIG. 1 is a schematic drawing of a first embodiment of the air conditioning system, according to the invention.

FIG. 1 depicts an air conditioning system.

By means of a flow control valve 12 that quantity of bleed air 10 that is required to supply fresh air for the cabin, is bled from a power plant at approximately 2 bar and 200 degrees C. During ground operation the bleed air is extracted at approximately 3 bar from an auxiliary power plant. First, the bleed air is passed through a primary heat exchanger 14 and then cooled to approximately 80 degrees C. The heat exchanger is an air-to-air heat exchanger, wherein ambient air 16 is used as the cooling medium. The volumetric rate of flow of the cooling air 16 is adjusted by means of a fan 18 during ground operation. During flight operation the fed in stagnant air suffices as the cooling medium, whereby the volumetric rate of flow can be adjusted by means of a throttle flap 17. The bleed air, cooled to approximately 80 degrees C., is compressed in a first compressor C1 and, issuing from said first compressor, further compressed in a second compressor C2 to approximately 5 bar. This compressed air, coming from the second compressor, is cooled to approximately 45 degrees C. by means of ambient air 16 in a main heat exchanger 20, also in an air-to-air heat exchanger. The compressor C1 of the first compressor stage forms together with an air expansion turbine T2 and the fan 18 a three wheel air cycle machine.

That means that the compressor C1 and the fan 18 are driven regeneratively by means of the energy, recovered in the air expansion turbine T2. The second compressor C2 is coupled to an air expansion turbine T1. It is also driven regeneratively by means of the energy, recovered in the air expansion turbine T2. Thus, the air conditioning system, shown in FIG. 1, is a 2+3 wheel machine. Of course, the invention is not limited to the 2+3 wheel machine, illustrated here. It can also be designed, for example, as a 2+2 wheel machine, where there is only one compressor. Or it can be designed as a 4 wheel machine, where two air expansion turbines are disposed on one shaft.

The highly compressed air, coming from the main heat exchanger 20, is delivered to the first air expansion turbine T1. Owing to the expansion the pressure and the temperature drop, a feature that causes the water to condense. The air, issuing from the first turbine T1, exhibits the water in a very finely distributed mist. This air is passed into a water separator, which in the embodiment, shown here, comprises a drop coalescing unit 30 and a downstream water separator 32. In the embodiment illustrated here, the drop coalescing unit 30 comprises an air-to-air heat exchanger packing.

The fine droplets, which are dragged along by the flow, coalesce on the sheet metal of the heat exchanger packing. They are separated out in the downstream water separator 32. The air, issuing from the water separator, is passed into a heat exchanger 34, where it is heated by a few degrees Kelvin so that the free water passes over into the gaseous phase. The resulting air that is completely liberated of free water is passed from the heat exchanger 34 to a second air expansion turbine T2, where it is lowered to the desired ambient pressure, prevailing in the airplane cabin.

In the heat exchanger 34, the air from the water separator 32 is heated by guiding the air from the compressor C1, which is passed on to the compressor C2, in a countercurrent to the air from the water separator. The reference numeral 36 in FIG. 1 refers to a bypass unit, by means of which the highly compressed air, coming from the heat exchanger 20, can be delivered directly to the second air expansion turbine T2. In this bypass unit, the water separator circulation can be bypassed which is recommended when the ambient air of the airplane is very dry, as is the case, for example, during flight operation. In this case, the air conditioning system is operated as a three wheel system.

In the embodiment, according to FIG. 1, the moisture of the air to be conditioned is controlled, first of all, in that the air expansion turbine exhibits an inlet nozzle 80, whose inlet cross section can be adjusted. By adjusting the inlet cross section, the degree of air expansion can be changed so that it can be adjusted to a predeterminable temperature level at the end of the air first expansion turbine T1. The lower the temperature level is set, the more free water is generated that can be subsequently separated in the water separator 30, 32. Correspondingly, when the temperature level is lowered, comparatively drier air for air conditioning the airplane cabin is produced.

Figure 5:
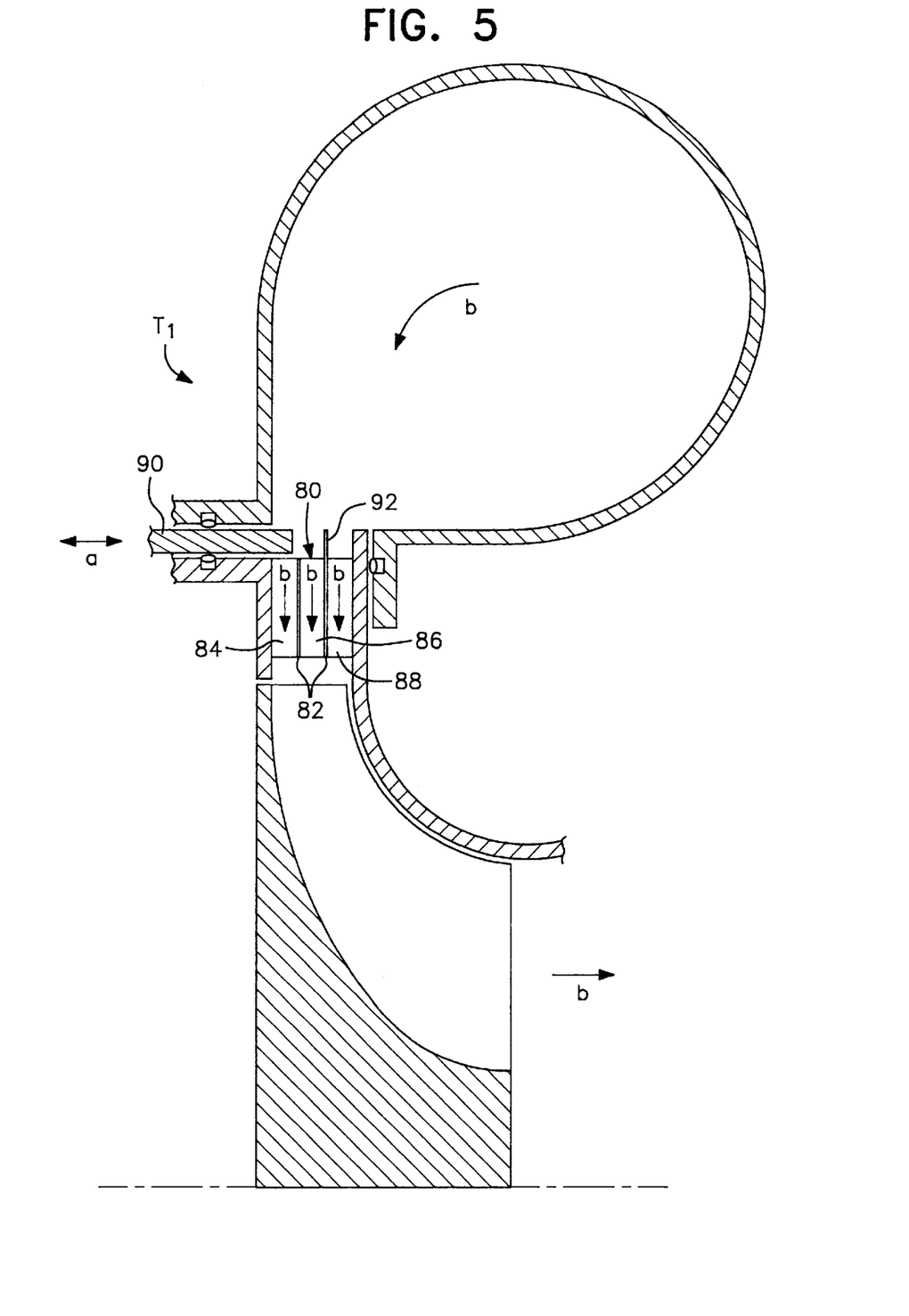
FIG. 5 is a schematic drawing of a first embodiment of an air expansion turbine with variable nozzle cross section.

FIG. 5 is a schematic drawing of a detail of an air expansion turbine T1 with adjustable inlet cross section 80. The cross section defines the inlet channels 84, 86, and 88, which are separated from each other by means of several walls 82. The channels can be closed at least partially by means of a gate valve 90. In the embodiment, illustrated here, the gate valve 90 can be slid as far as a stop 92, thus closing the channels 84 and 86, whereas the channel 88 remains open. Thus, when the gate valve 90 closes, the smallest possible cross section of the nozzle is realized. In this manner the maximum degree of expansion is achieved for the first air expansion turbine T1 in the embodiment, illustrated here. The direction of the twin arrows a indicates the direction in which the gate valve 90 can be slid. The single arrows b show the direction of the air flow.

In FIG. 1, the reference numeral 100 indicates a valve unit, which makes it possible to feed an arbitrary fraction of the air, diverted from the inlet of the second compressor C2, directly behind the first air expansion turbine T1. In this manner, comparatively hot air is fed in the compressed state directly to the water separator 30, 32. Owing to the high temperature level, comparatively little free water will be generated so that here air with high moisture is provided for air conditioning the airplane cabin. A fan with valve unit 100 can also serves to de-ice.

Figure 2:
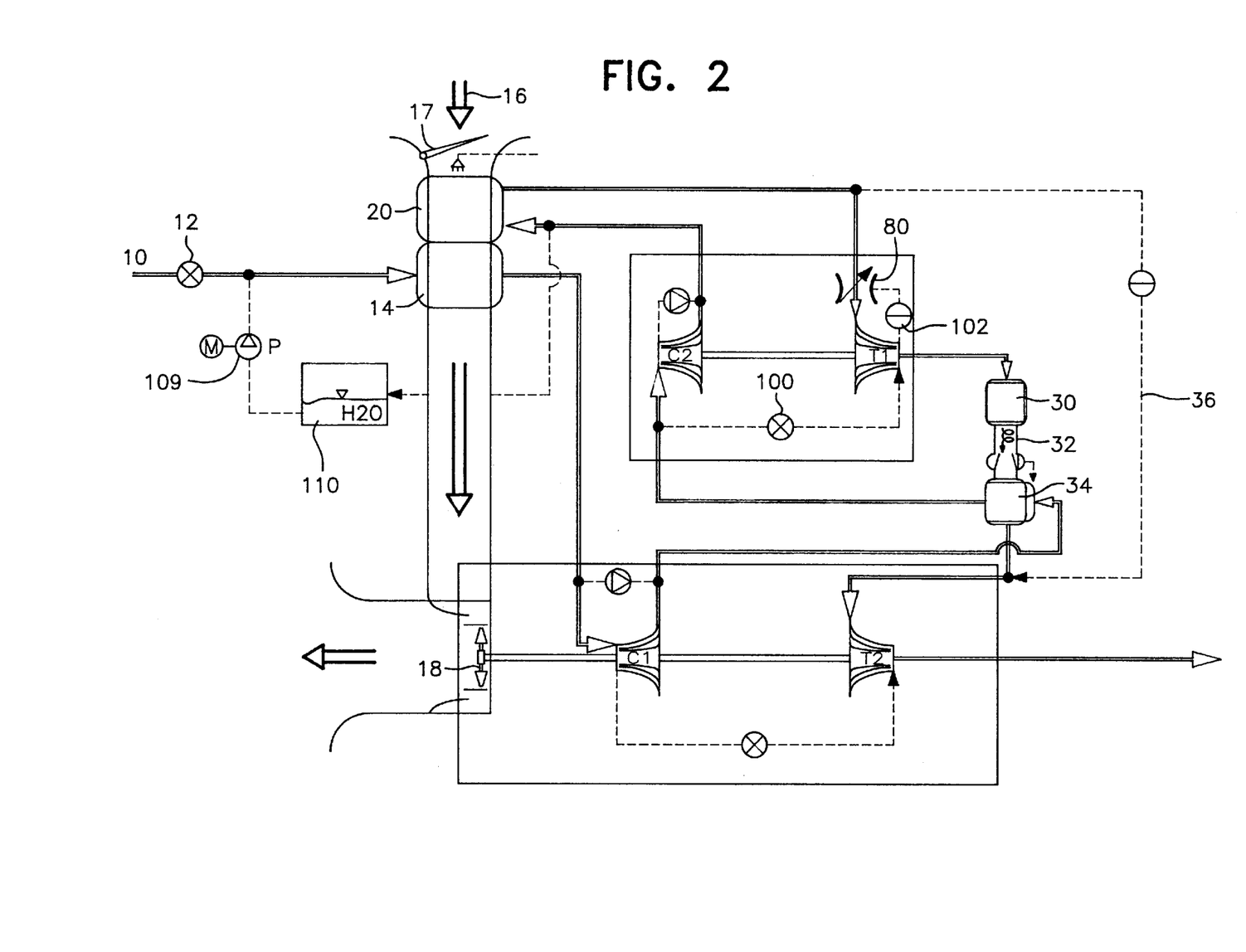
FIG. 2 is a schematic drawing of a second embodiment of the present invention.

FIG. 2 depicts another embodiment of the invention. Identical parts are provided with identical reference numerals. In this embodiment, there is in front of the primary heat exchanger 14 a humidifier 110, with which the bleed air 10 can be actively humidified. The air, which is diverted from the compressed air stream, which flows from the compressor C2, is fed into the humidifier 110. Water or water droplet laden air is injected into the bleed air 10 by means of a pump 109, as shown in FIG. 2.

Figure 6:
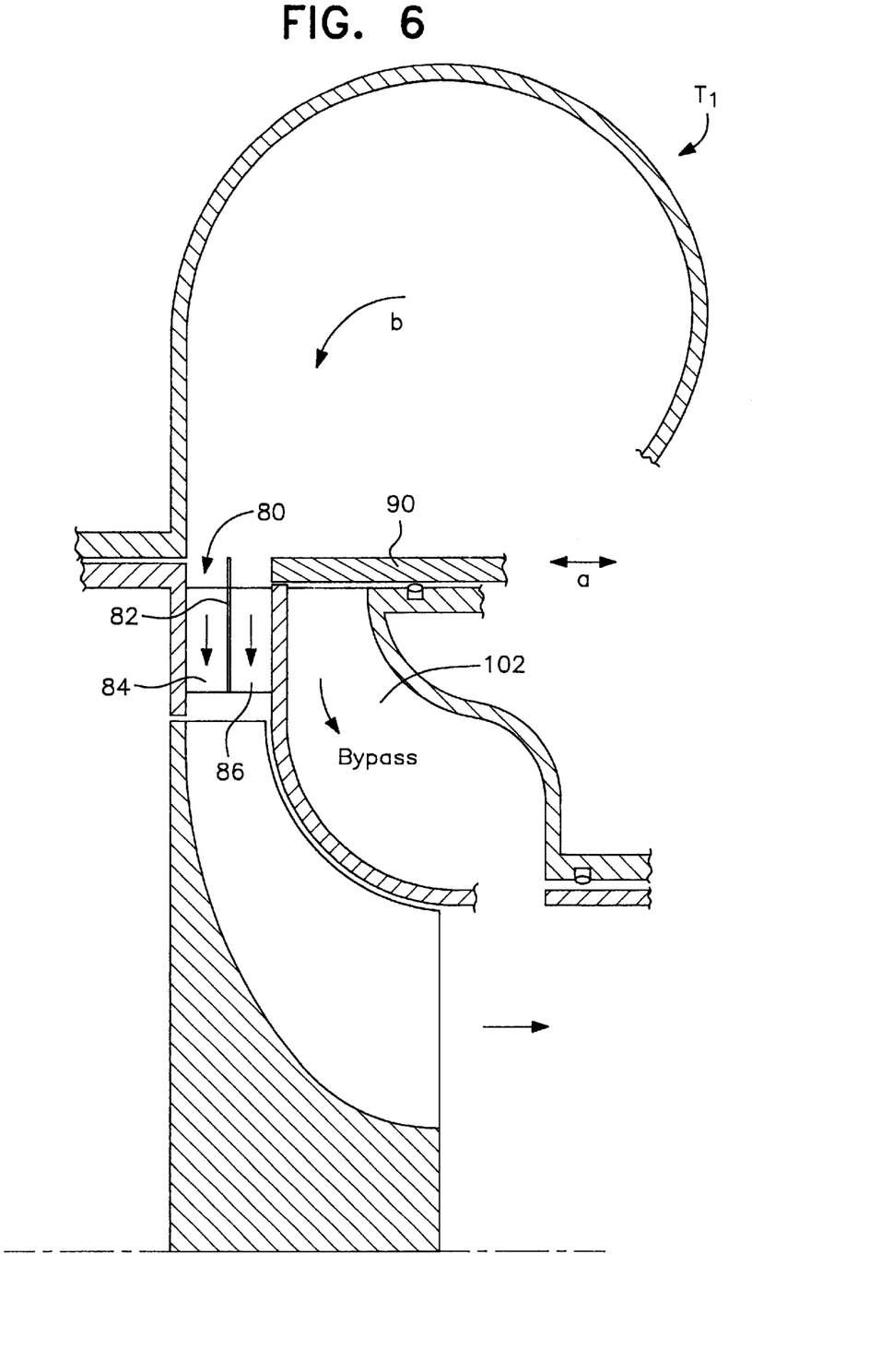
FIG. 6 is a schematic sectional drawing of a second embodiment of an air expansion turbine with variable nozzle cross section and a bypass that can be connected.

Furthermore, an air expansion turbine, which corresponds to that of FIG. 6, is installed here as the air expansion turbine T1. The turbine exhibits not only a variable nozzle cross section 80, which comprises in the present case only two channels 84 and 86, which are separated from each other by means of a separating wall 82, but also a bypass 102. On the one hand, the nozzle cross section 80 can be changed by covering the channel 86 by means of a gate valve 90, which can be slid in the direction a of the double arrow. On the other hand, the bypass 102, which is depicted as a schematic in FIG. 2 and which directs the air past the first air expansion turbine T1, can also be activated to open. Thus, the air, guided by means of the bypass 102, is not expanded in the air expansion turbine T1 and thus remains also at the turbine input temperature level. Thus, the temperature will vary and also the degree of moisture of the air, issuing from the turbine, will differ as a function of the position of the gate valve 90.

Figure 3:
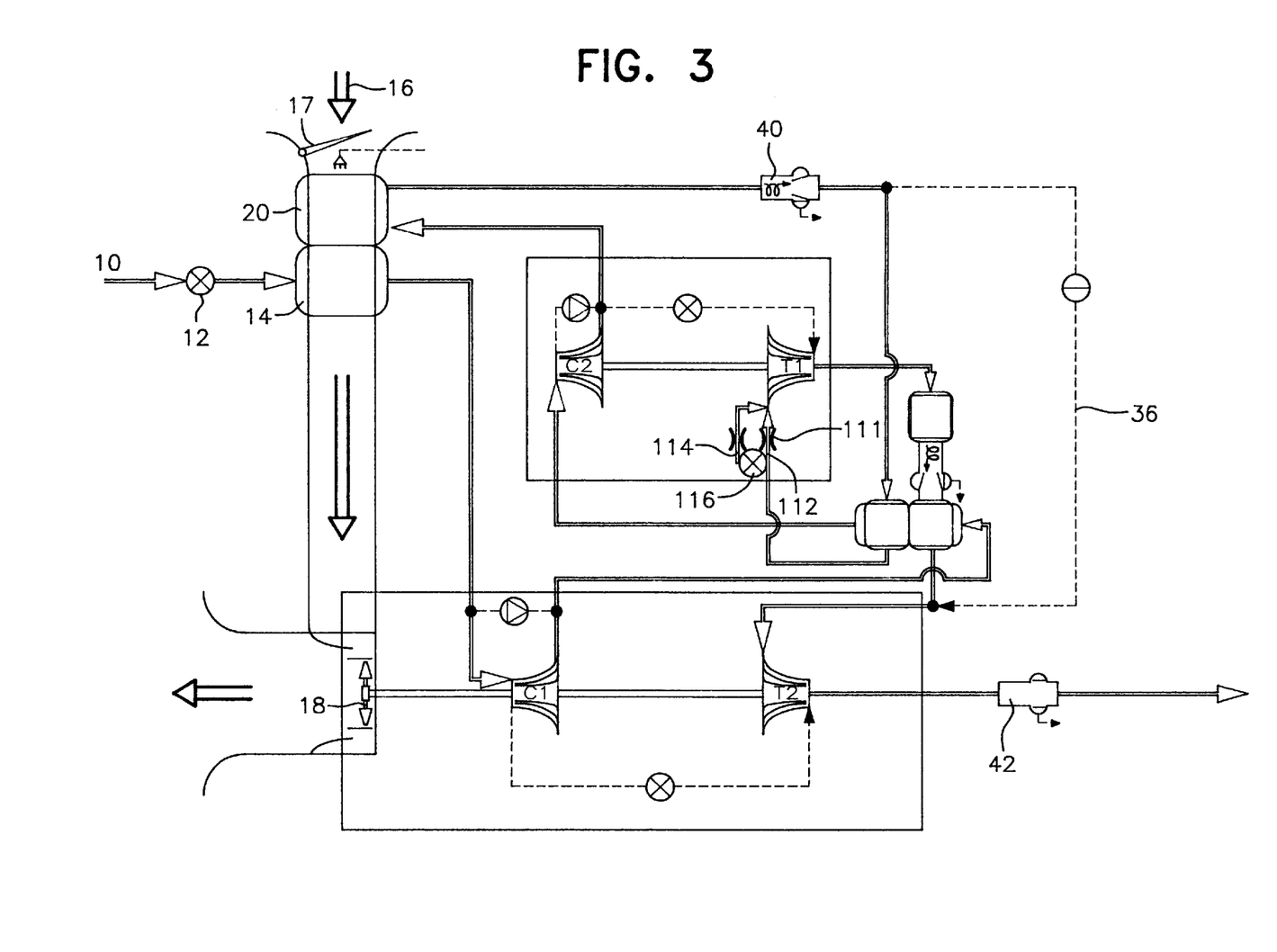
FIG. 3 is a schematic drawing of a third embodiment of the present invention.

The embodiment, according to FIG. 3, corresponds in essence to that in FIG. 1. Here the identical parts are provided again with identical reference numerals. Of course, the heat exchanger, which is downstream of the water separator 32, is constructed as two parts. On the one hand, it is one of the previous embodiments of heat exchangers 34, whose construction is the same and where the air, issuing from the air expansion turbine T1, is guided in a countercurrent to the air, issuing from the compressor C1. However, this heat exchanger is followed by—or also connected in parallel to—a second heat exchanger, whose construction is the same and in which the air, coming from the first heat exchanger half 34 and which originates from the compressor C1, is also guided in a countercurrent in relation to the highly compressed air from the main heat exchanger 20. In the embodiment, depicted here, there are also 2 water separators 40 and 42, whereby the water separator 40 serves to separate out the free water in the highly compressed air, flowing from the main heat exchanger 20. The water separator 42 is downstream of the second air expansion turbine T2. This water separator 42 is designed preferably without swirl unit to minimize the danger of icing up.

Figure 7:
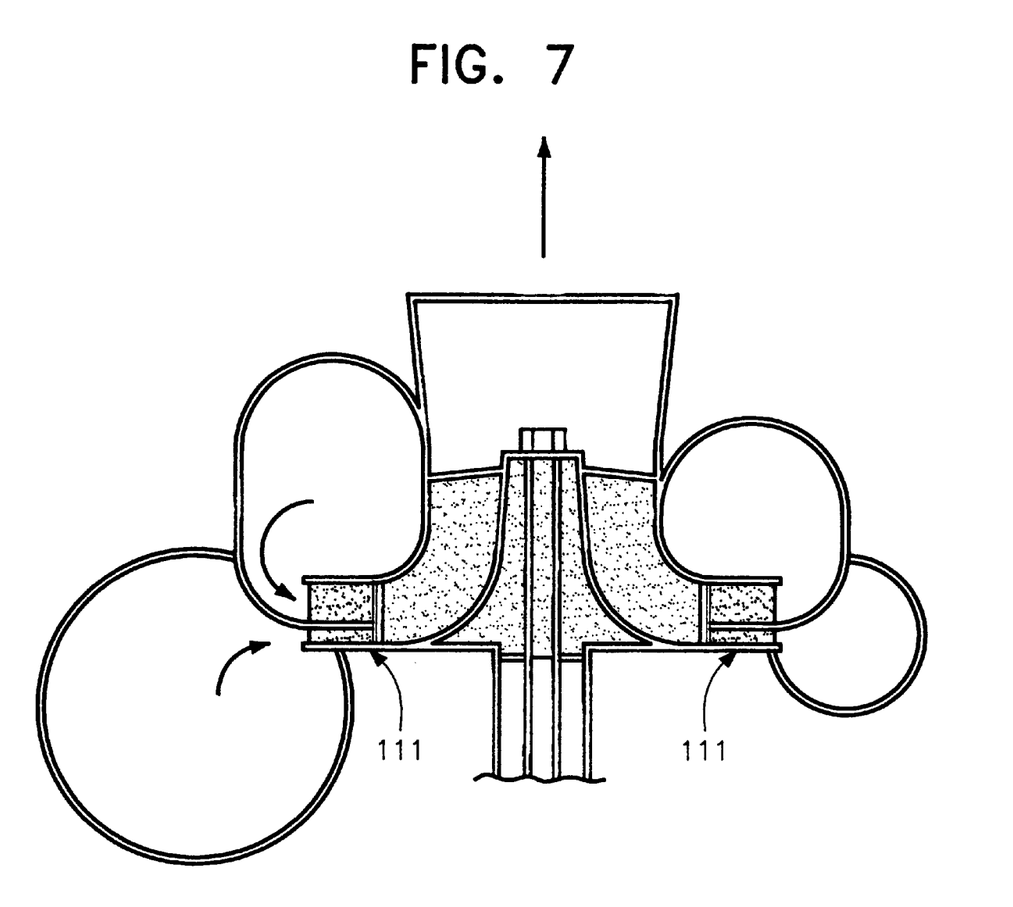
FIG. 7 is a schematic drawing of a third embodiment of an air expansion turbine with a twin nozzle.

In the embodiment, illustrated here, the air, coming from the main heat exchanger 20, is delivered to an air expansion turbine with twin nozzle 111, as depicted as an example in FIG. 7. Here a separate feed 112 or 114 is assigned to each nozzle. The feed 114 can be closed by means of a valve 116 so that the entire air is guided only by means of a partial nozzle of the twin nozzle 111, thus achieving a higher degree of expansion and thus a lower temperature of the air expansion turbine T1.

Thus, the embodiment, presented here, exhibits a two stage control of the air moisture.

Figure 4:
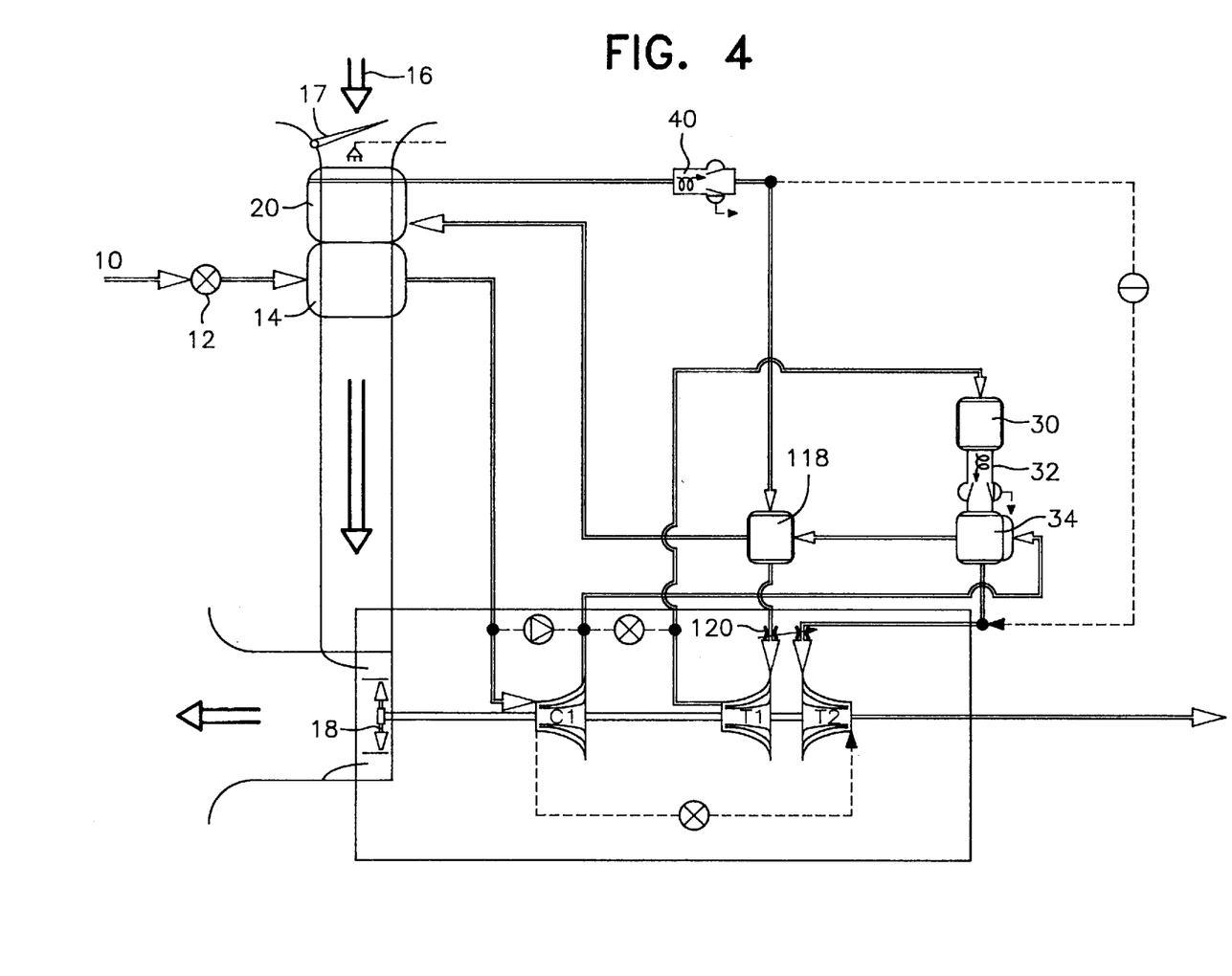
FIG. 4 is a schematic drawing of a fourth embodiment of the present invention.
Figure 8:
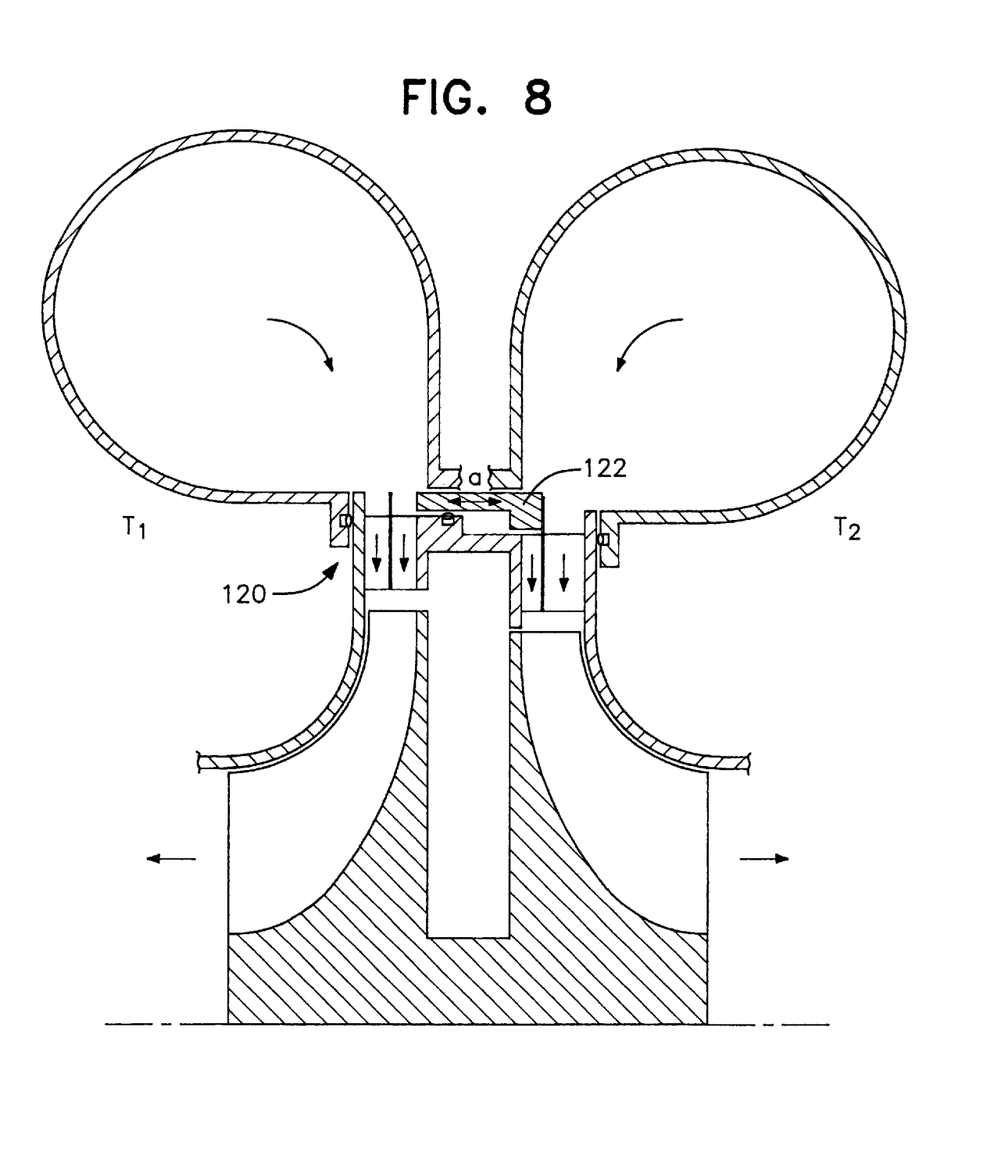
FIG. 8 is a schematic drawing of a fourth embodiment of an air expansion turbine, whereby here two air expansion turbines, which are disposed side by side on a shaft, exhibit an adjustable nozzle cross section in the coupled state.

The embodiment, shown in FIG. 4, exhibits a 4 wheel machine, where the air expansion turbines T1 and T2 are disposed directly side by side on a shaft next to the fan 18 and a compressor C1. The air, coming from the heat exchanger 20, is guided by way of a water separator 40 and then into a heat exchanger 118. From there the air flows into the inlet of the air expansion turbine T1. From the outlet of the air expansion turbine T1, it is guided, as, for example, also in the embodiments, discussed with reference to FIGS. 1 to 3, into the drop coalescing unit 30 and then into the water separator 32. The air, issuing from the water separator 32, is guided in turn into the heat exchanger 34, where it is heated by a few degrees Kelvin so that the free water passes over into the gaseous phase. The air, which is thus completely liberated of free water, is guided from the heat exchanger 34 to the second air expansion turbine. In the embodiment, illustrated here, the two air expansion turbines are coupled together in such a manner that they exhibit a coupled, adjustable nozzle cross section 120, as shown in detail with the aid of FIG. 8. When this nozzle cross section is present, the degree of expansion of the two air expansion turbines T1 and T2 is adjusted by means of a gate valve 122, which can be slid in the direction a of the double arrows. The result is an energy optimized control of the moisture by shifting the degree of expansion of the two air expansion turbines in relation to each other. This arrangement enables a very compact construction of this embodiment.

If it is desired, the coupling of the adjustment of the degree of air expansion of the two air expansion turbines T1 and T2 can also be realized in embodiments with two separate shafts, thus for example, in a 2+2 wheel machine or a 2+3 wheel machine, where the air expansion turbines T1 and T2 are mounted on different shafts.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. Air conditioning system for airplanes for conditioning moisture containing air under excess pressure, said air conditioning system comprising:
    at least one compressor for compressing the air, already fed under excess pressure, to an even higher pressure;
    a first air expansion turbine for expanding the air to a lower pressure;
    a second air expansion turbine, which is downstream of the first one, to further expand the air; and
    a water separator, which is positioned between the first air expansion turbine and the second air expansion turbine;
    said air expansion in the first air expansion turbine being selectively adjustable.

2. The air conditioning system, as claimed in claim 1, wherein the first air expansion turbine includes variable nozzle cross sections for selectively adjusting said air expansion.

3. The air conditioning system, as claimed in claim 2, wherein the nozzle cross section can be changed by a gate valve.

4. The air conditioning system, as claimed in claim 1, wherein the first air expansion turbine includes a twin nozzle connected to separate air feeds and one of said feeds can be blocked for selectively choosing a desired nozzle.

5. The air conditioning system, as claimed in claim 1, wherein the first air expansion turbine includes a bypass for directing at least one substream of the air past said first air expansion turbine.

6. The air conditioning system, as claimed in claim 5, further comprising a gate valve for controlling the bypass to open or close.

7. The air conditioning system, as claimed in claim 1, further comprising a control valve for controllably feeding a fraction of the air directly from the inlet or outlet of the second compressor behind the first air expansion turbine.

8. The air conditioning system, as claimed in claim 1, further comprising a humidifier disposed upstream of a primary heat exchanger for air bled from a power plant.

9. The air conditioning system, as claimed in claim 1, wherein the further air expansion in the second air expansion turbine also is selectively adjustable.

10. The air conditioning system, as claimed in claim 9, wherein the second air expansion turbine includes variable nozzle cross sections.

11. The air conditioning system, as claimed in claim 10, wherein the nozzle cross section can be changed by a gate valve.

12. The air conditioning system, as claimed in claim 9, wherein the second air expansion turbine includes a twin nozzle connected to separate air feeds and one of said feeds can be blocked.

13. The air conditioning system, as claimed in claim 9, wherein the second air expansion turbine includes a bypass for directing at least one substream of the air past said second air expansion turbine.

14. The air conditioning system, as claimed in claim 13, further comprising a gate valve for controlling the bypass to open or close.

15. The air conditioning system, as claimed in claim 9, further comprising a control valve for controllably feeding a fraction of the air directly from the inlet or outlet of a compressor behind the first air expansion turbine.

16. The air conditioning system, as claimed in claim 1, wherein the first and second air expansion turbines are disposed on a common shaft.

17. The air conditioning system, as claimed in claim 16, further comprising the nozzle cross sections of the first and second air expansion turbines are adjustable in coupled state.

18. The air conditioning system, as claimed in claim 1, wherein the first and second air expansion turbines are disposed on a separate shaft.

19. The air conditioning system, as claimed in claim 18, wherein the nozzle cross sections of the first and second air expansion turbines are separately adjustable as a function of each other.

20. An airplane air conditioning system for conditioning air and removing moisture contained in the air, when the air is under a first pressure, said air conditioning system comprising at least one compressor for compressing the air to a second pressure which is higher than said first pressure, a first air expansion turbine positioned after said at least one compressor for expanding the air to a first lower pressure, a second air expansion turbine positioned after said first air expansion turbine for expanding the air to a second lower pressure, a controller positioned after said at least one compressor and before said first air expansion turbine for selectively adjusting the air prior to expanding in said first air expansion turbine, and a humidifier positioned after said at least one compressor for humidifying the air.

* * * * *